Sept. 3, 1946.   J. M. TYLER ET AL   2,407,114
DRIVING MECHANISM
Filed July 19, 1943   4 Sheets-Sheet 1
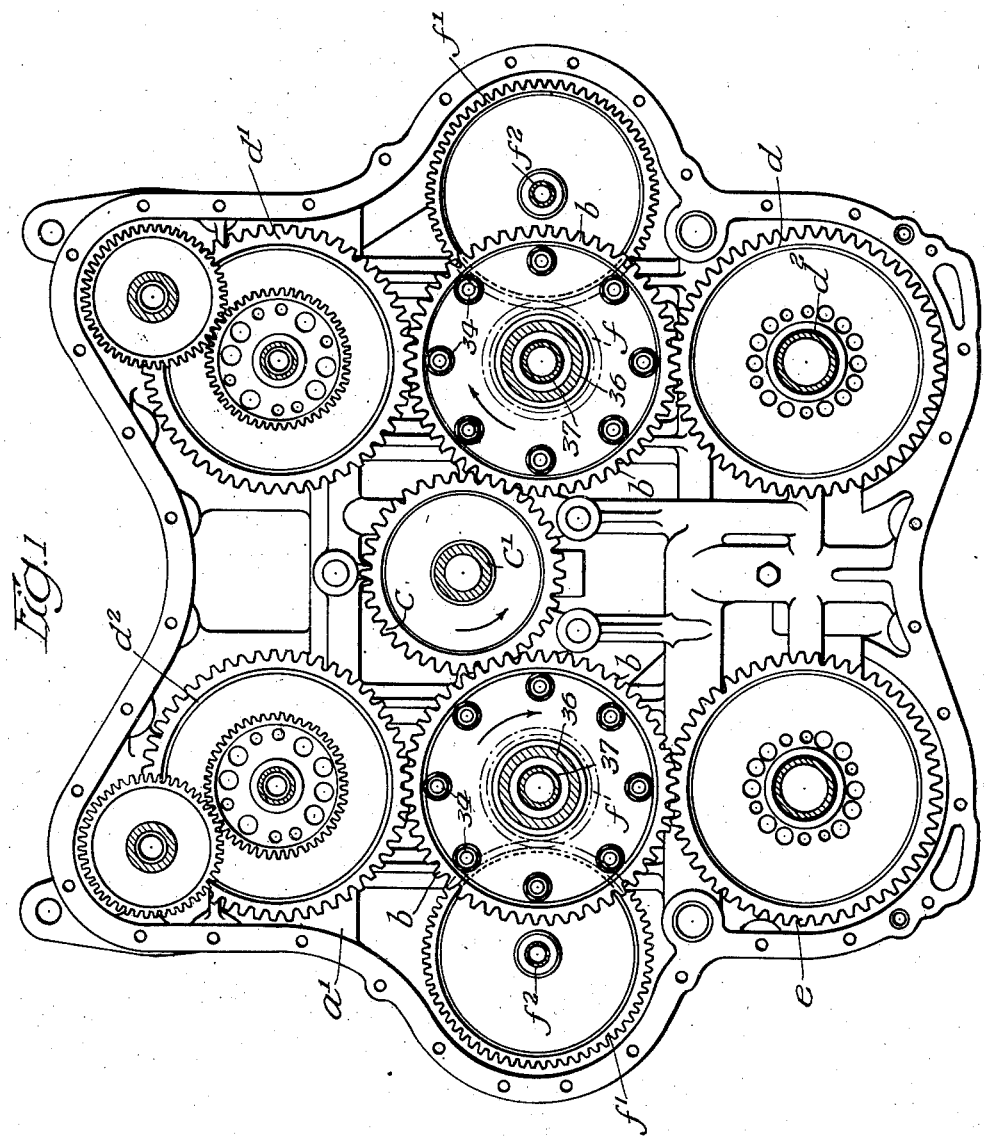

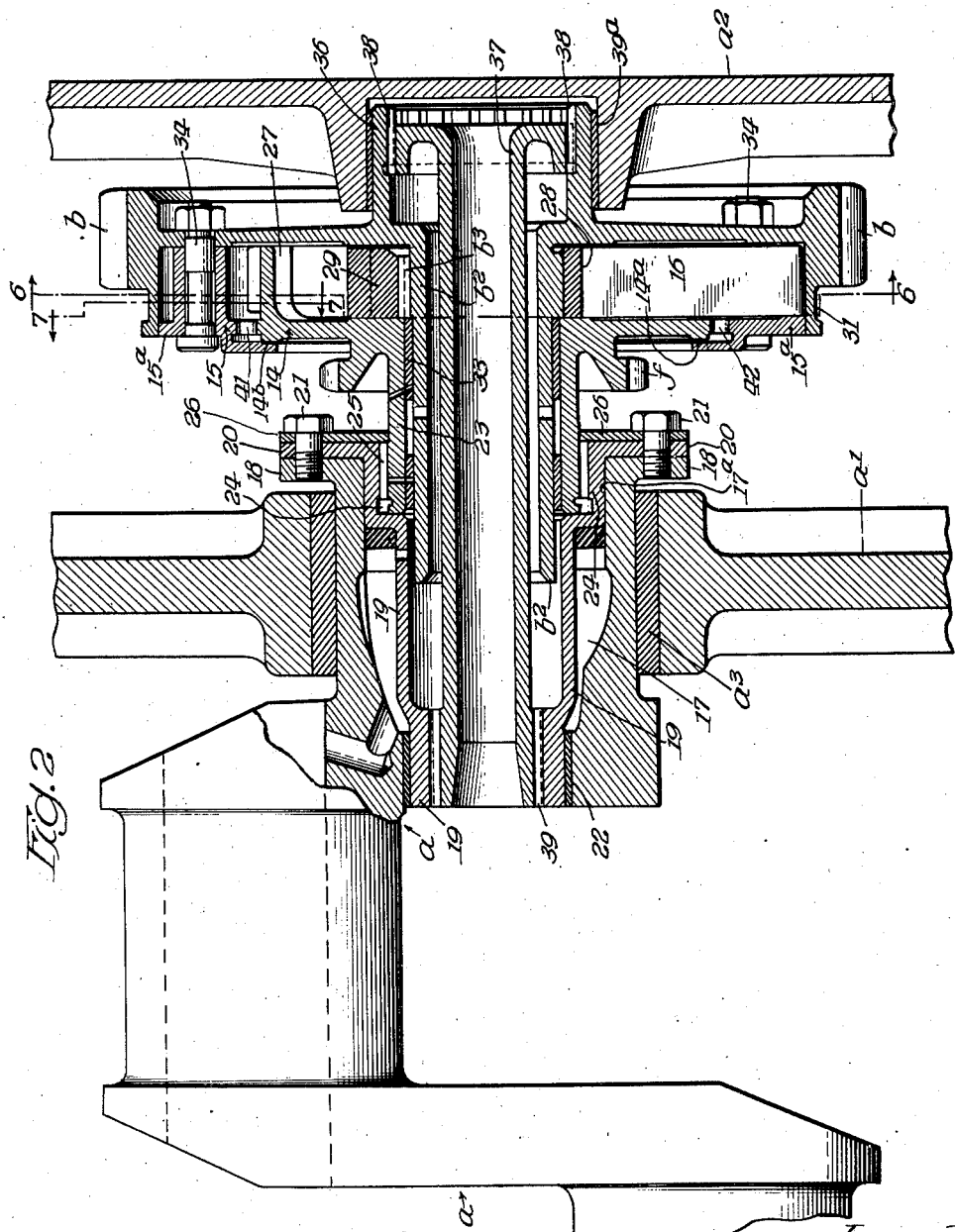

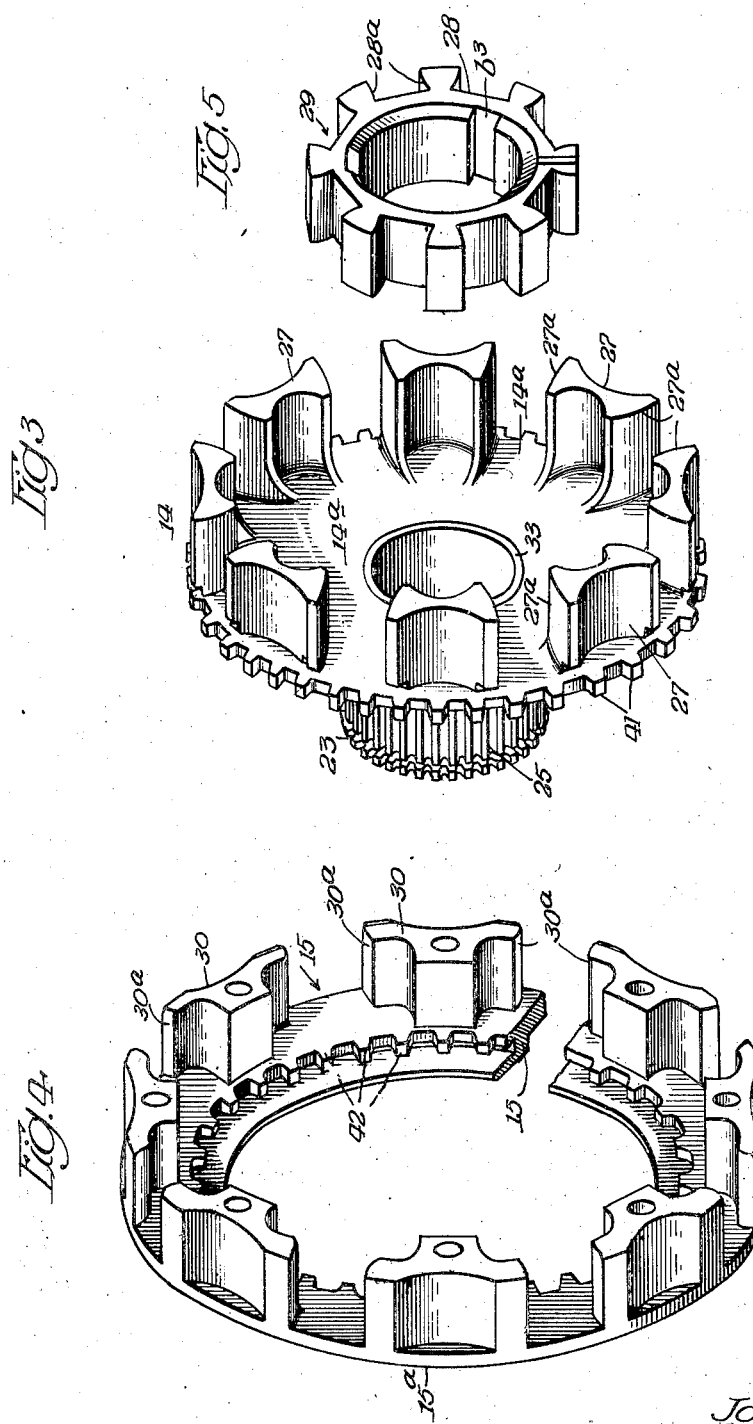

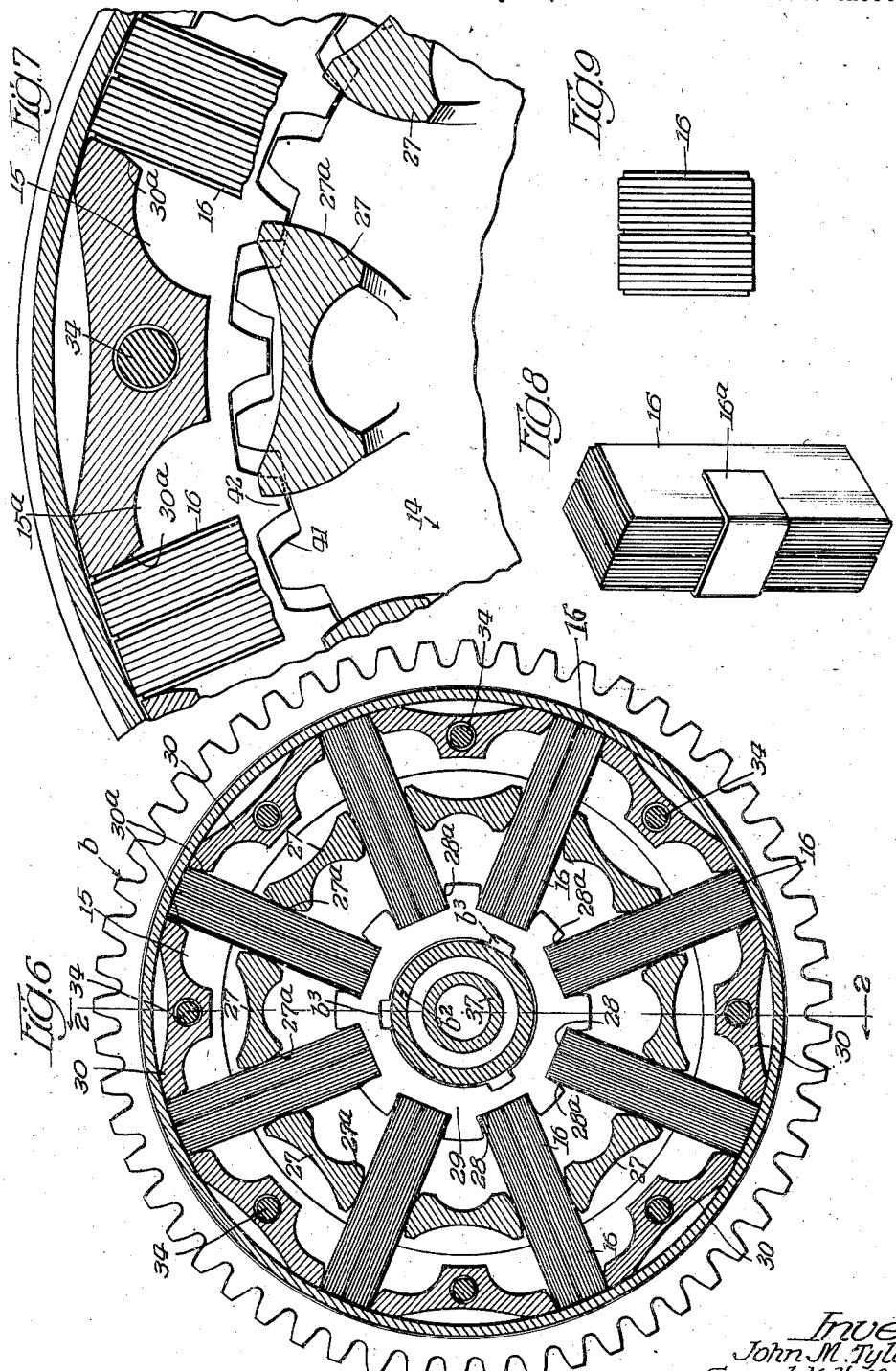

Patented Sept. 3, 1946

2,407,114

UNITED STATES PATENT OFFICE 2,407,114

DRIVING MECHANISM

John M. Tyler, West Hartford, Conn., and Samuel K. Hoffman, Williamsport, Pa., assignors to The Aviation Corporation, New York, N. Y., a corporation of Delaware Application July 19, 1943, Serial No. 495,242

7 Claims. (Cl. 74—411)

The invention relates to vibration damping driving mechanism more particularly adapted for use with internal combustion engines.

One object of the invention is to provide a vibration damping driving unit which is adapted to be advantageously applied to one end of an engine crankshaft for driving one or more of the engine accessories.

Another object of the invention is to provide gearing between two engine crankshafts which is adapted to damp the torsional vibrations in the crankshafts.

Another object of the invention is to provide improved vibration damping gearing for driving engine accessories from the crankshaft of the engine.

A still further object of the invention is to provide mechanism for resiliently driving an engine accessory which is adapted to be attached to one end of the crankshaft without substantial increase in the overall length of the engine to meet the small space requirements in engines used for aircraft.

Other objects of the invention will appear from the detailed description.

The invention consists in the several novel features which are hereinafter set forth and more particularly defined by claims at the conclusion hereof.

In the drawings:

Fig. 1 is an end view, the end-plate being removed, of an engine provided with two crankshafts, the vibration damping gear units on said shafts and the gearing for driving the accessories.

Fig. 2 is a longitudinal section of a portion of one of the crankshafts with a resilient driving unit thereon taken on line 2—2 of Fig. 6.

Fig. 3 is a perspective of the driving member which is mounted on and driven from one end of the engine crankshaft.

Fig. 4 is a perspective of the member which is driven by the driving member on the crankshaft.

Fig. 5 is a perspective of the collar in which the inner ends of the resilient or spring-plates are seated.

Fig. 6 is a section taken on line 6—6 of Fig. 2.

Fig. 7 is a section on an enlarged scale taken on line 7—7 of Fig. 2.

Fig. 8 is a perspective of one of the sets of spring plates for driving the driven member clipped together for convenience in inserting the set in the driving and driven members.

Fig. 9 is an end view of one of the sets of spring-plates.

The invention is exemplified with an internal combustion engine which comprises a pair of power crankshafts $aa$ which are usually geared, at one end of the engine, to a single output shaft (not shown). The engine accessories are driven from the opposite ends of the crankshafts $a$. These crankshafts are journaled in bearings $a^3$, as well understood in the art, in the engine casing which is provided with an end wall $a'$ and a cover plate $a^2$ for the chamber in which the gearing for driving the accessories is located. A resilient driving or vibration dampening unit is applied to each of the crankshafts in the chamber between the end wall $a'$ of the engine casing and the cover plate $a^2$. Each of these units includes a driven gear $b$. The gears $b$ of both of the resilient driving units mesh with a gear $c$ which functions to drive a shaft $c'$ which drives the supercharger (not shown) for the engine in any suitable manner. Each of the gears $b$ is resiliently driven, as hereinafter more fully described, from a crankshaft $a$ and drive the gear $c$ for driving the supercharger which is driven by both the resiliently driven gears $b$. The resilient units serve as vibration damping devices on both crankshafts and it has been found that when both resiliently driven gears $b$ mesh with a single gear $c$ the torsional vibration in the crankshafts will be damped so that vibration dampers on the cranks or crankshaft which form no part of driving units, may be dispensed with. It has also been found that when the supercharger driving gear $c$ is driven by two rotating gears $b$, destructive vibration of the supercharger drive shaft and excessive tooth wear in the gearing for driving it will be avoided. The resiliently driven gears $b$ are also used to drive the other accessories. The right hand gear $b$ in Fig. 1 meshes with a gear $d$ for driving the shaft $d^2$ for driving a generator and with a gear $d'$ for driving other accessories at one side of the engine. The gear $b$ at the left hand side of Fig. 1 meshes with a gear $e$ on a starter drive and with a gear $d^2$ for driving other accessories on the left hand side of the engine. Each resilient drive unit comprises a positively driven gear $f$, as hereinafter described, which meshes with a gear $f'$ for positively driving the drive shaft $f^2$ of a fuel injector. These shafts may be connected to the accessories, respectively, in any suitable or usual manner. The construction described exemplifies one in which the resiliently driven gears $b$ are driven from the rotating crankshafts to conjointly drive a single gear for driving the supercharger or one accessory, in which each of the resiliently driven gears $b$ drives other accessories and in which the gears $b$, when driven by an engine starter, will resiliently initiate the drive of the crankshaft and then provide for a rigid drive.

The resilient driving and vibration damping units for driving the gears $b$ respectively from the crankshafts are alike in construction so that a description of one is applicable to both. Each of these units comprises a driving member 14 (Figs. 2 and 3), a driven member 15 to which the gear $b$ is secured, and a series of sets of plate or leaf springs 16 through which the driven member 15 and gear $b$ are driven from the driving member 14 for vibration damping purposes. The end of crankshaft $a$ adjacent the gear $b$ has a socket 17 extending therethrough and is provided with an integral flange 18 at the outer side of the wall $a'$. A reentrant sleeve 19 is provided at its outer end with an integral flange 20 which is secured by screws 21 to the flange 18 on the shaft $a$ and extends inwardly through the socket 17 in the crankshaft. Adjacent to flange 18, sleeve 19 is provided with a cylindrical periphery $17^a$ which fits in the socket 17. The inner end of sleeve 19 is fitted in a bushing 22 in the crankshaft. The driving member 14 comprises a hub 23 which extends inwardly into a socket 24 formed in the outer end of sleeve 19. Sleeve 19 and hub 23 are provided with interfitting splines 25 for positively driving member 14 from sleeve 19 and crankshaft $a$. A retaining plate 26 for the hub 23 is secured to flange 20 of sleeve 19 by bolts 21 which secure flanges 18 and 20 together. The gear $f$ for driving one of the fuel injector units is formed on the hub of driving member 14. Driving member 14 also comprises a radial flange $14^a$ and integral longitudinally extending driving lugs or arms 27 which project axially and outwardly from flange $14^a$. Arms 27 are spaced apart to receive between them sets 16 of flat resilient plates or leaf springs which extend radially through the spaces between each adjacent pair of said arms. The side faces $27^a$ of the arms 27 abut against the outer plates of sets 16 and are curved to permit flexure of the springs between the arms. The inner ends of each set of plates 16 are seated in peripheral pockets or recesses 28 in a collar 29. The side faces $28^a$ of pockets 28 are curved to permit flexure of the springs 16. The end plates of each series 16 and the central plate are preferably somewhat thinner than the remaining plates so they will be more flexible to prevent snapping of the plates.

The driven member 15 comprises a ring $15^a$ and laterally projecting integral lugs or arms 30 which correspond in number to the arms 27 on the driving member 14 and are disposed radially outward of arms 27. Each set of plates 16 fits between the side faces $30^a$ of a pair of arms 30 and said faces are curved to permit flexure of the plates between said faces. Ring $15^a$ laps the inner marginal face of the flange $14^a$ of member 14 for an oil seal between them. Gear $b$ comprises a circumferential flange 31 which fits around the flange $15^a$ of driven member 15 and extends around the outer ends of the plate springs 16 and retains them against outward radial movement and seated in the collar 29. Gear $b$ has an integral sleeve or hub $b^2$ which extends axially through collar 29 and hub 23 and fits in bushings 33 in the hub 23 of driving member 14. Bolts 34 extend through the web of gear $b$ and arms 30 of driven member 15 and fixedly secure said member and said gear together. Sleeve $b^2$ is provided with splines $b^3$ which interfit with splines in collar 29. Gear $b$ has an integral outwardly extending cylindrical hub 36. The outer end of a torsionally resilient quill 37 and hub 36 are rotatively connected by splines 38. Quill 37 extends axially and inwardly through sleeve $b^2$ and at its inner end is connected by splines 39 to the inner end of the sleeve 19. Hub 36 fits in a bushing $39^a$ which is supported in the cover plate $a^2$. Each set of plate springs 16 comprises a sufficient number to fill the space between the faces $27^a$ of arms 27 on the driving member so that the contiguous faces of the blades will engage one another and frictionally retard the flexing of the plates. The outside and the central plates of each set of springs 16 are slightly shorter than the remainder to prevent cramping of the plates in the corners of the recesses 28 and between the side faces of the arms 27 and the cylindrical flange 31 of gear $b$.

In the construction described, the inner ends of the sets of spring plates 16 are confined in the collar 29 which is rigid through splines $b^3$ with the driven gear $b$, the outer ends of said sets of plates are confined between the arms 30 which are rigid with the gear $b$, so that torque will be applied to the inner and outer ends of said sets of plates from the torsionally resilient shaft 37 and the driving member 14 will apply torque to the intermediate portions of the sets of plates 16 for resiliently applying torque to the driven member $b$. The torsionally resilient shaft or quill 37 will transmit torque for driving a portion of the load on gear $b$ and the positively driven member 14 will transmit, resiliently through the leaf springs 16, torque for driving the remainder of the load on gear $b$. In this manner the torque for driving the entire load on gear $b$ is transmitted in part, in a somewhat positively degree by the quill 37 and the remainder is transmitter resiliently through the arms 27 and the resilient plates 16.

Driving member 14 is provided on the periphery of its flange $14^a$ with an external annular series of teeth or splines 41 which extend and are loosely received by an internal series of splines 42 in the driven member 15. The lost motion between the splines 42 on the driven member 15 and the splines 41 on the driving member 14 is sufficient for relative movement between the driving and driven members for driving the gear $b$ through the resilient sets of plates 16 and for vibration damping under predetermined or normal loads and are limited to cause said splines to engage and positively drive one of said members from the other under excessive loads. An excessive degree of flexing of the plates may result in giving them a permanent set or disengagement of their ends from the driven member. The splines 41, 42 limit the degree of relative rotation between the driving and driven members and thus prevent this excessive flexing. This occurs when an excessive load is placed on the gear $b$. In starting the engine by power applied through gears $e$, $b$ and the resilient driving units, the excessive torque required for starting will cause the splines 41, 42 to engage after the plates 16 have been flexed to the predetermined limit and cause the power to be positively applied. These springs or resilient plates during normal operation dampen the torsional vibrations in the engine shaft and also provide resilient drives for the gears $b$ and the accessories driven thereby. This damping of the vibrations avoids breakage of the accessory drive shafts and excessive tooth wear in the gearing for driving them. The driving member 14, the driven member 15 and the gear b are coaxial with the crankshaft, sleeve 19 extends into the socket in the end of the crankshaft, the driving member 14 has its hub 23 extending into the sleeve 19, the driven gear b has its sleeve $b^2$ extending through hub 23, and the quill 37 extends through the sleeve $b^2$, for providing a compact construction which will occupy little space adjacent the end of the shaft. The entire unit may be assembled endwise with the crankshaft. The members can be readily assembled endwise. The sets of plates 16 may be held together by clips 16ª for convenience in assembling them with the driving and driven members.

The operation will be as follows: While the engine is running the crankshaft $a$ will be driven and torque from both crankshafts will be applied to drive the gears $b$ which drives the gear $c$ for driving the shaft $c'$ which drives the supercharger. The crankshafts will each directly and positively drive a driving member 14 from the crankshaft through sleeves 24 and splines 25. The arms 27 on driving member 14 engaging the sets of resilient plates 16 are adapted to apply some torque to the driven member 15 and the gear $b$ which is fixed to member 15. The arms 27 on each driving member 14 engage and apply torque to the central portions of the sets of radial plates 16 and will resiliently drive the members 15 and gears $b$ through torque applied to the collar 29 and arms 30 by the ends of the sets of plates 16. The flexing of the plates will be retarded by friction between the contiguous faces of each of the plates of each set to dampen the torsional vibrations from the crankshaft. The resiliently driven gears $b$ will tend to equalize the torque from both crankshafts $a$ on the gear $c$, and tend to damp torsional vibrations in the crankshafts. The other accessories will be driven by the resiliently driven gears $b$ to avoid breakage and excessive tooth wear. During this operation the torsionally resilient quill 37 will transmit torque for positively driving a portion of the load on the gear $b$ and driving the driven member 15 and the gear $b$ by the arms 27 to be applied by the resilient plates 16. Each driving member 14, driven member 15 and the sets of spring plates 16 constitute a vibration damping or resilient driving unit when the load on the crankshaft from the accessories is normal. When the torque being transmitted through the gear units substantially exceeds normal, the spring plates 16 will flex sufficiently to permit the splines 41 on driving member 14 to engage the splines 42 on driven member 15 and effect a positive drive between said members. When the engine is being started, the torque will be transmitted to the crankshaft $a$ from gear $e$, via gears $b$, members 15, plates 16 and members 14, splines 25 and sleeves 24 which are fixed to the crankshafts.

The invention exemplifies driving mechanism which includes resilient driving or gear units which are driven by a pair of crankshafts of an engine which will dampen the torsional vibrations in the crankshafts and will also resiliently drive the accessories to damp torsional vibrations and shock stresses which cause breaking of the accessory drive shafts and excessive tooth wear in the gearing for driving the accessories. The gear units are compact and are adapted to be mounted on and in the ends of the crankshafts and occupy little space, so as to avoid substantial increase in the overall length of the engine. The construction is one which is adapted for engines of high horse power and function to efficiently dampen vibrations in the crankshafts and in the accessories driven by the gear units.

The invention is not to be understood as restricted to the details set forth since these may be modified within the scope of the appended claims without departing from the spirit and scope of the invention.

Having thus described the invention, what I claim as new and desire to secure by Letters Patent is:

1. The combination with the crankshaft of an internal combustion engine, the shaft having a socket in one of its ends, of a resilient driving unit comprising a sleeve secured to the outer end of the shaft and extending into said socket, a driving member provided with a tubular hub extending into and having a splined connection to one end of said sleeve, a driven member having a sleeve extending into said hub, a gear fixed to said driven member, and resilient means between the members, for driving one member from the other.

2. The combination with the crankshaft of an internal combustion engine, the shaft having a socket in one of its ends, of a resilient driving unit comprising a sleeve secured to the outer end of the shaft and extending into said socket, a driving member provided with a tubular hub extending into and splined to one end of said sleeve, a driven member having a sleeve extending into said hub, a gear fixed to the driven member, sets of radially extending frictionally contacting flat spring-plates, for resiliently driving one member from the other, one member being provided with means for retaining the ends of the plate-sets, and the other with means for engaging the sets between the ends.

3. The combination with the crankshaft of an internal combustion engine, the shaft having a socket in one of its ends, of a resilient driving unit comprising a sleeve secured to the outer end of the shaft and extending into said socket, a driving member having a tubular hub extending into and splined to one end of said sleeve, a driven member comprising a ring around the driving member, and a gear around and fixedly secured to said ring, a sleeve on the gear extending into said hub, and resilient driving means between the members.

4. The combination with the crankshaft of an internal combustion engine, the shaft having a socket in one of its ends, of a resilient driving unit comprising a sleeve secured to the outer end of the shaft and extending into said socket, a driving member provided with a tubular hub extending into and splined to one end of said sleeve, a driven member having a sleeve extending into said hub, a gear fixed to the driven member, and having a hub in the sleeve, resilient driving means between the members, and a shaft extending through the hub of the gear and having its inner end splined to the sleeve fixed to the shaft and its outer end splined to the gear.

5. The combination with the crankshaft of an internal combustion engine, the shaft having a socket in one of its ends, of a resilient driving unit comprising a sleeve secured to the outer end of the shaft and extending into said socket, a driving member provided with a tubular hub extending into and having a splined connection to one end of said sleeve, a driven member having a sleeve extending into said hub, a gear fixed to said driven member, a shaft splined to the gear and to the sleeve, resilient driving means between the members and a loose spline connection between the members.

6. The combination with a crankshaft of an internal combustion engine of a driving unit for one or more engine accessories on one end of the crankshaft, said unit comprising a driving member fixed to the shaft, resilient radial plates engaged by the driving member, a driven member engaged by the plates, a gear on said driven member, said gear and members being coaxial with the crankshaft and a torsionally resilient shaft between the driven gear member and the crankshaft.

7. The combination with the crankshaft of an internal combustion engine, one end of the crankshaft being provided with a socket, of a driving unit for one or more engine accessories on said end of the crankshaft, said unit comprising a driving member fixed to the shaft, resilient radial plates engaged by the driving member, a driven member engaged by the plates, and a gear on said driven member, said gear and members being coaxial with and having hollow portions extending into the socket in the crankshaft.

JOHN M. TYLER.
SAMUEL K. HOFFMAN.